United States Patent
Chen et al.

(10) Patent No.: US 10,041,476 B2
(45) Date of Patent: Aug. 7, 2018

(54) SYSTEMS, METHODS AND APPARATUS FOR IMPROVED ENERGY MANAGEMENT SYSTEMS WITH SECURITY-ORIENTED PROBABILISTIC WIND POWER GENERATION DISPATCH

(71) Applicant: Siemens Industry, Inc., Alpharetta, GA (US)

(72) Inventors: Dingguo Chen, Eden Prairie, MN (US); Michael E. York, Rogers, MN (US)

(73) Assignee: Siemens Industry, Inc., Alpharetta, GA (US)

( * ) Notice: Subject to any disclaimer, the term of this patent is extended or adjusted under 35 U.S.C. 154(b) by 322 days.

(21) Appl. No.: 14/853,068

(22) Filed: Sep. 14, 2015

(65) Prior Publication Data

US 2016/0061189 A1    Mar. 3, 2016

Related U.S. Application Data

(60) Provisional application No. 62/044,565, filed on Sep. 2, 2014.

(51) Int. Cl.
*G05D 3/12* (2006.01)
*F03D 7/04* (2006.01)
*F03D 7/02* (2006.01)

(52) U.S. Cl.
CPC ........... *F03D 7/048* (2013.01); *F03D 7/0284* (2013.01); *F05B 2270/404* (2013.01); *Y02E 10/723* (2013.01); *Y02E 10/725* (2013.01)

(58) Field of Classification Search
CPC ..... Y02E 10/723; Y02E 10/763; Y02E 40/34; Y02E 40/72; Y02E 40/30; F03D 7/048; F03D 7/0292; F03D 7/042; F03D 7/0284; F03D 7/043; F03D 80/50; H02J 3/16; H02J 3/06; H02J 3/46; F05B 2270/20; F05B 2270/332; F05B 2240/96; Y04S 50/10; Y04S 10/54; G05B 13/021; G05B 13/024; G05B 15/02; G05B 2219/2619
See application file for complete search history.

(56) References Cited

U.S. PATENT DOCUMENTS

| | | | |
|---|---|---|---|
| 7,274,975 B2 | 9/2007 | Miller | |
| 7,454,270 B2* | 11/2008 | Mansingh | ............... G06Q 50/06 700/291 |
| 8,290,634 B2* | 10/2012 | Larsen | ..................... H02J 3/16 290/44 |

(Continued)

*Primary Examiner* — Darrin D Dunn

(57) ABSTRACT

Embodiments provide systems, methods and apparatus for controlling an energy delivery system including providing an energy management system (EMS) having a wind power management (WPM) system and using the WPM system for determining sensitivity values for a plurality of wind farms within the energy delivery system; maximizing wind power generation from the plurality of wind farms within a set of security limits defined based on the sensitivity values; minimizing wind power generation loss from the plurality of wind farms; determining wind farm security-priority groups; minimizing wind power generation production cost based on cost priority of the wind farms in each security-priority group; and minimizing wind power generation production cost based on energy bids for each wind farm in each security-priority group. Numerous other aspects are provided.

14 Claims, 5 Drawing Sheets

(56) References Cited

U.S. PATENT DOCUMENTS

| | | | | |
|---|---|---|---|---|
| 8,577,509 B2* | 11/2013 | Ong | ............... | F03D 7/0292 |
| | | | | 700/287 |
| 8,853,877 B1* | 10/2014 | Zalar | ............... | F03D 7/048 |
| | | | | 290/44 |
| 9,816,483 B2* | 11/2017 | Nakamura | ............... | F03D 7/00 |
| 2002/0103745 A1 | 8/2002 | Lof et al. | | |
| 2004/0098142 A1* | 5/2004 | Warren | ............... | F01D 15/10 |
| | | | | 700/22 |
| 2007/0213878 A1* | 9/2007 | Chen | ............... | H02J 3/00 |
| | | | | 700/291 |
| 2009/0281675 A1* | 11/2009 | Rasmussen | ............... | F03D 7/047 |
| | | | | 700/287 |
| 2010/0274401 A1* | 10/2010 | Kjaer | ............... | F03D 7/0284 |
| | | | | 700/287 |
| 2010/0332373 A1 | 12/2010 | Crabtree | | |
| 2014/0001763 A1* | 1/2014 | Kragelund | ............... | H02P 9/04 |
| | | | | 290/55 |
| 2014/0021720 A1* | 1/2014 | Nelson | ............... | H02J 3/386 |
| | | | | 290/44 |
| 2014/0103653 A1* | 4/2014 | Ubben | ............... | F03D 7/028 |
| | | | | 290/44 |
| 2014/0248123 A1* | 9/2014 | Turner | ............... | F03D 7/0292 |
| | | | | 415/1 |
| 2015/0137518 A1* | 5/2015 | Yin | ............... | F03D 7/0284 |
| | | | | 290/44 |
| 2016/0049792 A1* | 2/2016 | Burra | ............... | G05B 19/0421 |
| | | | | 307/52 |

* cited by examiner

SYSTEMS, METHODS AND APPARATUS FOR IMPROVED ENERGY MANAGEMENT SYSTEMS WITH SECURITY-ORIENTED PROBABILISTIC WIND POWER GENERATION DISPATCH

RELATED APPLICATIONS

The present application claims priority to U.S. Provisional Application No. 62/044,565 titled "Security Oriented Probabilistic Wind Generation Dispatch" filed Sep. 2, 2014, which is incorporated herein by reference for all purposes.

FIELD

The present invention relates to operating energy delivery systems, and more specifically to improved energy management systems with wind power generation dispatch.

BACKGROUND

An energy management system (EMS) is a system of computer implemented tools used by operators of electric utility grids to monitor, control, and optimize the performance of the generation and/or transmission of an energy delivery system. In other words, an EMS optimizes, supervises and controls the transmission grid and generation assets. The monitoring and control functions are known as "supervisory control and data acquisition" (SCADA). Control such a system involves autonomous automatic actions by the EMS to arrest deviations in power system frequency whenever imbalances arise between load and generation. Primary frequency control actions include governor response, load damping, and voluntary frequency-responsive load control, all of which contribute to frequency response. Secondary frequency control involves centrally coordinated actions by the EMS to return frequency to its scheduled value. They are deployed both during normal operations and after primary frequency control resources have arrested frequency imbalance following major disturbances. Secondary frequency control actions include generation (or load) that responds to automatic generation control (AGC) signals or to operator dispatch commands. AGC is often referred to as "regulation" service.

The proliferation of renewable energy and particularly wind power, present significant challenges to EMSs and energy market management systems (EMMS). Because these energy sources are frequently intermittent, it can be difficult to incorporate the energy they produce into existing power distribution systems that are designed to provide continuous, reliable power. Thus, there is a significant need to provide systems, methods and apparatus for improved energy management systems with wind power generation dispatch.

SUMMARY

In some embodiments, a method of controlling an energy delivery system is provided. The method includes providing an energy management system (EMS) having a wind power management (WPM) system and using the WPM system for determining sensitivity values for a plurality of wind farms within the energy delivery system; maximizing wind power generation from the plurality of wind farms within a set of security limits defined based on the sensitivity values; minimizing wind power generation loss from the plurality of wind farms; determining wind farm security-priority groups; minimizing wind power generation production cost based on cost priority of the wind farms in each security-priority group; and minimizing wind power generation production cost based on energy bids for each wind farm in each security-priority group.

In other embodiments, an energy management system (EMS) is provided. The EMS includes a process controller; a memory coupled to the process controller and storing instructions executable on the process controller, the instructions operable to cause the processor to: determine sensitivity values for a plurality of wind farms within an energy delivery system; maximize wind power generation from the plurality of wind farms within a set of security limits defined based on the sensitivity values; minimize wind power generation loss from the plurality of wind farms; determine wind farm security-priority groups; minimize wind power generation production cost based on cost priority of the wind farms in each security-priority group; and minimize wind power generation production cost based on energy bids for each wind farm in each security-priority group.

In still other embodiments, a wind power management (WPM) system within an EMS is provided. The WPM system includes a WPM application operative to execute on a server to determine optimal wind farm setpoints, the WPM application including: a data transfer application operative to request a contingency analysis and communicatively coupled to a WPM database within a transmission network application; a contingency ranking and operator enforcements module operative to determine if a contingency is critical and communicatively coupled to the WPM database within the transmission network application; a maximize wind generation within security limits module operative to determine a maximum admissible wind generation while considering security limits and communicatively coupled to the WPM database within the transmission network application; a minimize wind generation loss module operative to determine wind farm setpoints while minimizing wind generation loss and communicatively coupled to the WPM database within the transmission network application; and a wind generation setpoint validation module operative to validate wind farm setpoints obtained from a wind power optimization processes and communicatively coupled to the WPM database within the transmission network application.

Numerous other aspects are provided in accordance with these and other aspects of the invention. Other features and aspects of the present invention will become more fully apparent from the following detailed description, the appended claims and the accompanying drawings.

DESCRIPTION

Figure 1:
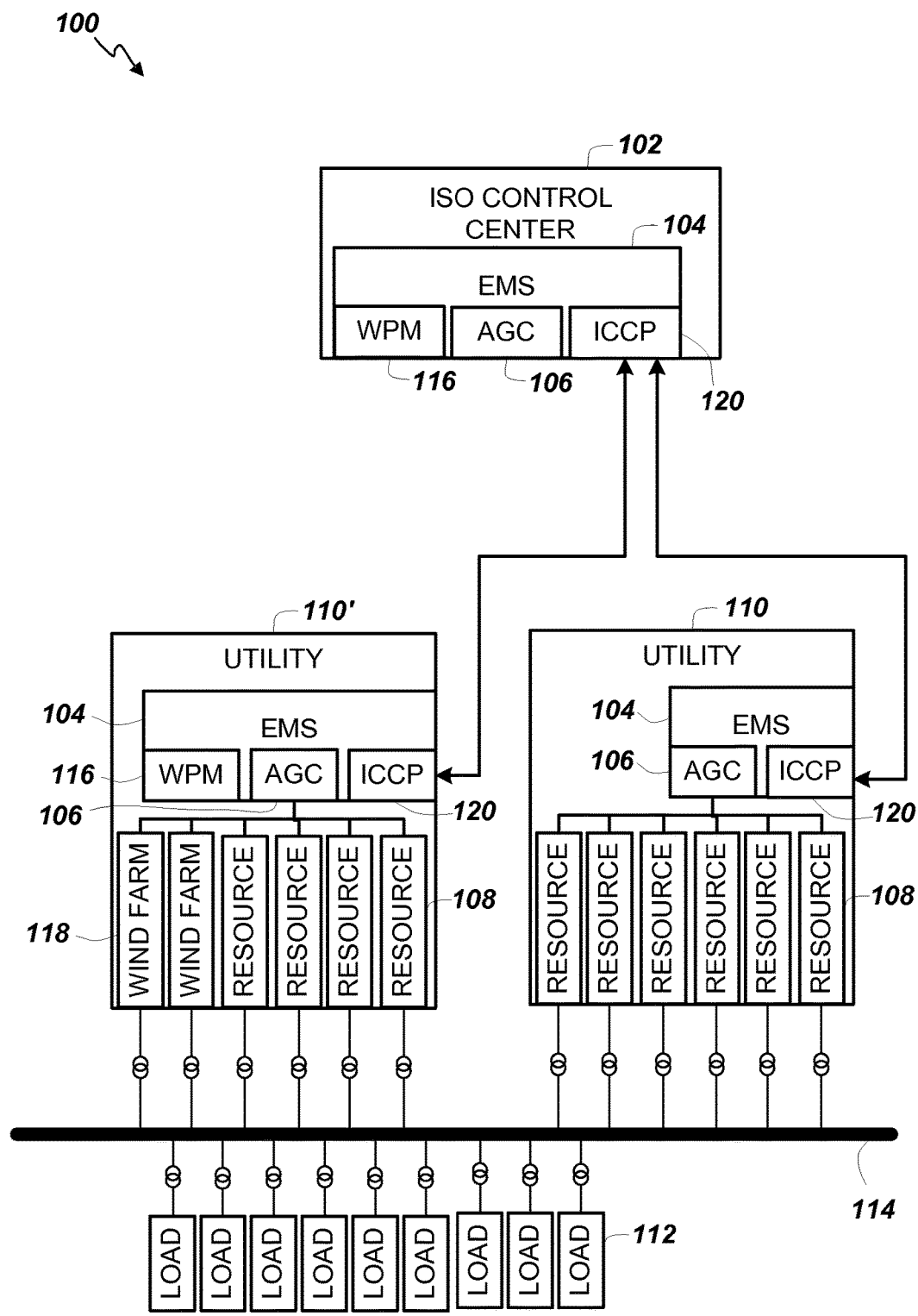
FIG. 1 is a block diagram depicting a portion of an example energy delivery system according to embodiments of the present invention.

Embodiments of the present invention provide systems, apparatus and methods for an improved energy management system (EMS) for electricity delivery, or more generally, energy delivery systems. Embodiments of the present invention include software applications and systems adapted to provide a wind power management (WPM) system within the EMS that provides security-oriented, probabilistic wind power generation dispatch. The WPM system is responsible for dispatching wind farms in a manner such that as much wind power as possible can be injected into the power grids without degrading system security and still achieve the best overall system economics.

The WPM system operates in conjunction with an automatic generation control (AGC) system (e.g., a suite of applications). The WPM system conducts grid-security related optimization processes and determines setpoints for associated wind farms. These setpoints are stored in a WPM operational database. In addition, these setpoints will also be updated to a real-time AGC database. Then the AGC system, in particular a load frequency control (LFC) application, retrieves these setpoints from the AGC real-time database and sends out the setpoints to respective remote terminal units (RTU's) via a communication front end (CFE) or inter-control center protocol (ICCP).

The WPM system is configurable in the sense that the dispatch time interval can be configured as any desired period (e.g., 5 minutes, 15 minutes, 20 minutes, 30 minutes, etc.). In each time interval, the WPM system executes several core tasks that work together in a coordinated manner to acquire the needed data for fault analysis, wind farm setpoint optimization, and to store the results in the WPM operational database that can be used for reporting. The WPM system can include a state estimator's (SE) base case preparation function; a contingencies preparation function; a fault analysis function (which in particular can include, e.g., a three-phase short-circuit analysis using, for example, PTI PSS/E software manufactured by Siemens Industry, Inc. of Washington, D.C.); a contingency ranking function based on wind power loss associated with a three-phase short-circuit event; a maximizing wind generation function based on a probabilistic approach; a minimizing wind generation loss function based on a probabilistic approach; and an optimal dispatch of wind farms function that also respects wind farms' dispatch priorities resulting in several priority-group-wise optimal dispatch processes each of which is responsible for the optimal dispatch of wind farms with a specific dispatch priority.

In some embodiments, the optimization process takes into account the operator-enforced system constraint that defines the maximum wind power by all the wind farms in the system that can be integrated and operator-enforced wind farm group constraints each of which defines the maximum wind power by a group of wind farms that can be allowed for integration. Further, the optimization process ensures that the power grid's security is not compromised. The WPM system can also include a validating function and a publishing function for validating and publishing the wind farm's setpoints.

Along with an ever increasing penetration of large amount of renewable energy, especially wind power into the power grids around the world, existing EMSs and EMMSs require enhancements to manage, accommodate, and control wind power and other types of renewable energy (e.g., like solar power, run-of-river hydro power, etc.) to optimize economic and environmental benefits. With the common understanding that renewable energy resources are intermittent in nature, a large amount of renewable energy sources connected to the power grids presents a great challenge for the reliable operation of the power grids, and as a result, a substantially increased amount of reserve from traditional, fast start-up generating resources is made available. To secure the reliable operation of the power grids, there are times that only some of the renewable energy resources are allowed to connect to the grids. At other times, there is a priority to first use renewable energy, such as wind power, as much as possible up to the renewable energy sources' maximum capacities.

Some wind farms (also known as wind parks) may provide wind power through long term contracts, others may compete for provision of their wind power to the power grids. The enhanced EMS of embodiments of the present invention is operable to dispatch power from wind farms based on a cost analysis for delivery of a certain amount of wind power generation and security analysis to determine how much wind power generation should be allowed for integration into the power grid.

Turning now to FIG. 1, a portion of an example energy deliver system 100 according to embodiments of the present invention is provided. Independent System Operators (ISO) 102 operate control centers that can include an EMS 104. The EMS 104 can include a number of hardware and software components for monitoring, controlling, and optimizing the performance (e.g., in terms of minimizing cost, maximizing efficiency, and maximizing reliability) of the generation and transmission of the energy delivery system 100.

The EMS 104 includes an automatic generation control (AGC) system 106 for adjusting the power output of multiple resources 108 (e.g., generators) at different power plants (e.g., utilities 110, independent power producers (IPP) and/or non-utility generators (NUG), etc.), in response to changes in the load created by consumers of the electricity. The generated power is delivered from the resources 108 to power consumers' loads 112 via transmission lines 114. Note that the utilities 110 can include an EMS 104 with an AGC system 106. Utilities 110' that include one or more wind farms 118 include a wind power management (WPM) application 116 as part of their EMS 104. To support such utilities 110', the ISO's EMS 104 also includes the WPM application 116. To facilitate communications and control between the EMSs 104, the EMSs 104 also implement an inter-control center protocol (ICCP) 120.

Embodiments of the present invention in the form of a WPM application 116 can be added to the AGC systems of existing commercially available EMS products such as the Spectrum Power 3™ and the Spectrum Power TG™ Energy Management Systems manufactured by Siemens Industry, Inc. of Washington, D.C.

Since a power grid requires that generation and load closely balance moment by moment, frequent adjustments to the output of resources 108 are continuously made. The balance can be judged by measuring the system frequency; if system frequency is increasing, more power is being generated than used, and the generators in the system 100 are accelerating. If the system frequency is decreasing, more load is on the system 100 than the instantaneous generation can provide, and the generators in the system 100 are slowing down.

Where the grid has tie interconnections to adjacent control areas, the AGC system 106 helps maintain the power interchanges over the tie lines at the scheduled levels. With computer-based control systems and multiple inputs, an AGC system 106 can take into account such matters as the most economical units to adjust, the coordination of thermal, hydroelectric, wind, and other generation types, and constraints related to the stability of the system and capacity of interconnections to other power grids.

Figure 2:
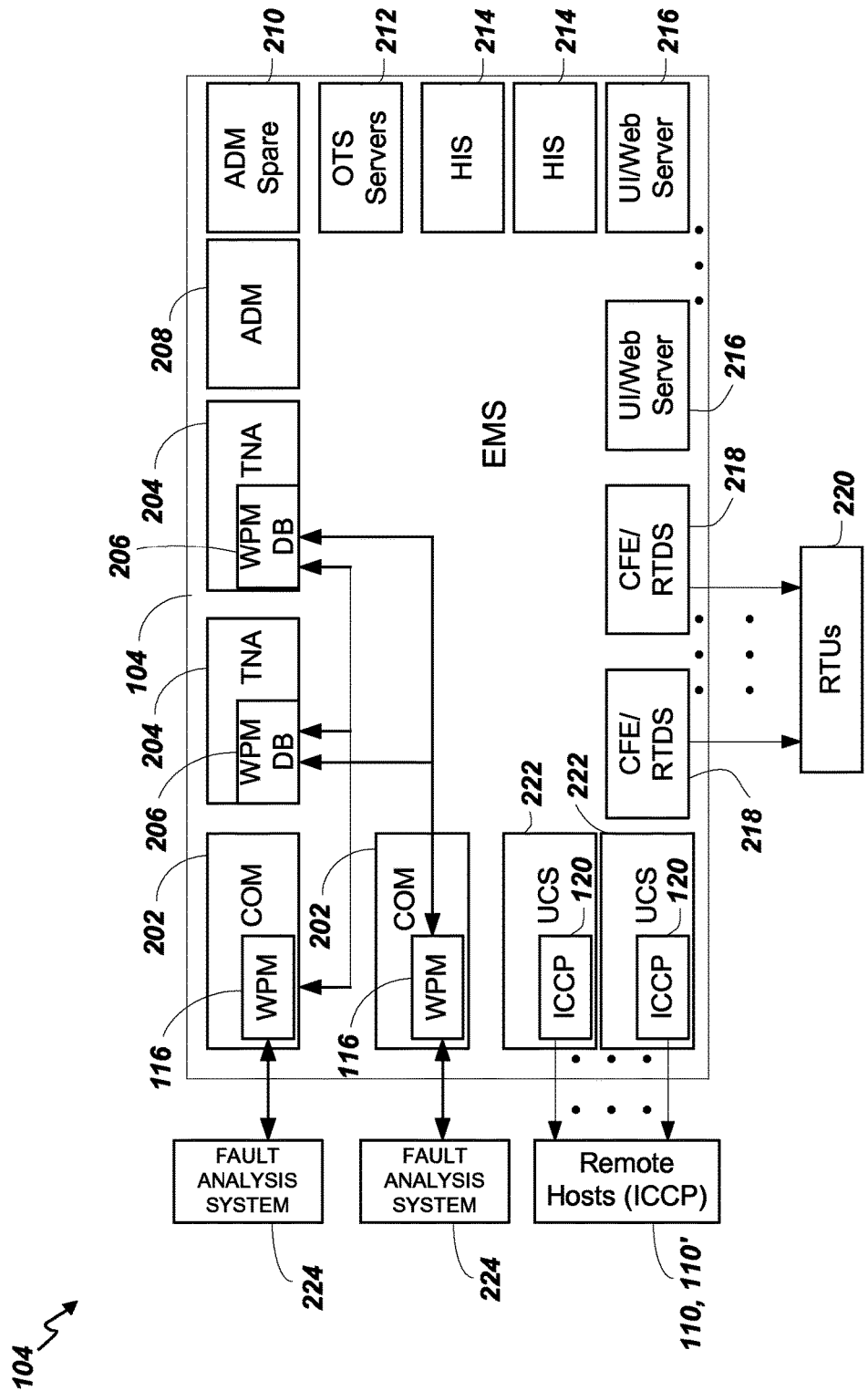
FIG. 2 is a block diagram of details of an example energy management system according to embodiments of the present invention.

Turning now to FIG. 2, an example configuration of an EMS 104 (e.g., an EMS 104 operated by an ISO) that supports operation of the WPM application 116 to control wind farms 118 according to embodiments of the present invention is shown. Embodiments of the EMS 104 can be implemented with a communicator (COM) server 202 (e.g., server implemented) that includes the WPM application 116. The EMS 104 can include redundant back-up servers to provide higher reliability and fault-tolerance. Thus, as shown in FIG. 2, redundant standby servers are also provided. A transmission network application (TNA) executes on a TNS sever 204 that includes a WPM database 206 which is commutatively coupled to the WPM application 116. The EMS 104 can also include an administration server ADM 208, an ADM Spare 210, an operator training simulator server OTS 212, servers that implement a Historical Information System (HIS) 214, user interface/web servers 216. The WPM application 116 can also be communicatively coupled to a fault analysis system 224 such as the PTI PSS/E software mentioned above.

EMS 104 further includes one or more Utility Communication Servers 222 that each provide an implementation of an Inter-Control Center Communication Protocol (ICCP) 120 that enables communication with, for example, other EMSs in operation at, for example, several utilities 110 (FIG. 1). In some embodiments, ICCP 120 can be used to implement remote control of resources 108 including wind farms 118 (FIG. 1) by implementing AGC system 106 communications between different EMSs. The EMS 104 also includes a communication front end (CFE)/Real Time Data Server (RTDS) 218 to facilitate communications with external entities and users via remote terminal units (RTUs) 220. Note that RTUs 220 are part of the power utilities' field devices, for example.

In operation, the ISO clears the real time market through its market optimization engine and then ISOs the dispatch instructions along with ancillary service awards (e.g., regulation, reserves, etc.) to individual power utilities through a transport mechanism (e.g., ICCP 120). The power utilities receive the dispatch instructions (e.g., via ICCP 120) and then make use of their AGC 106 to compute a power setpoint command for each AGC cycle for the resources under AGC control (i.e., AGC units). Next, the setpoints are updated to SCADA and they are then sent to the utilities' RTUs 220 via the CFE/RTDS 218. There are dedicated RTU lines that connect the RTUs to the CFE/RTDS 218 via, e.g., modems. Typically, RTUs are geographically located in the utilities' substations and hardwired to the resources (e.g., generators). The various applications such as, for example, AGC 106, SCADA, CFE/RTDS 218, and ICCP 120 are part of EMS 104. The RTUs 220 are field devices that are capable of sending telemetry to the ISO EMS 104 and can also receive megawatt (MW) setpoints from the ISO EMS 104 to control resources (e.g., generators).

Figure 3:
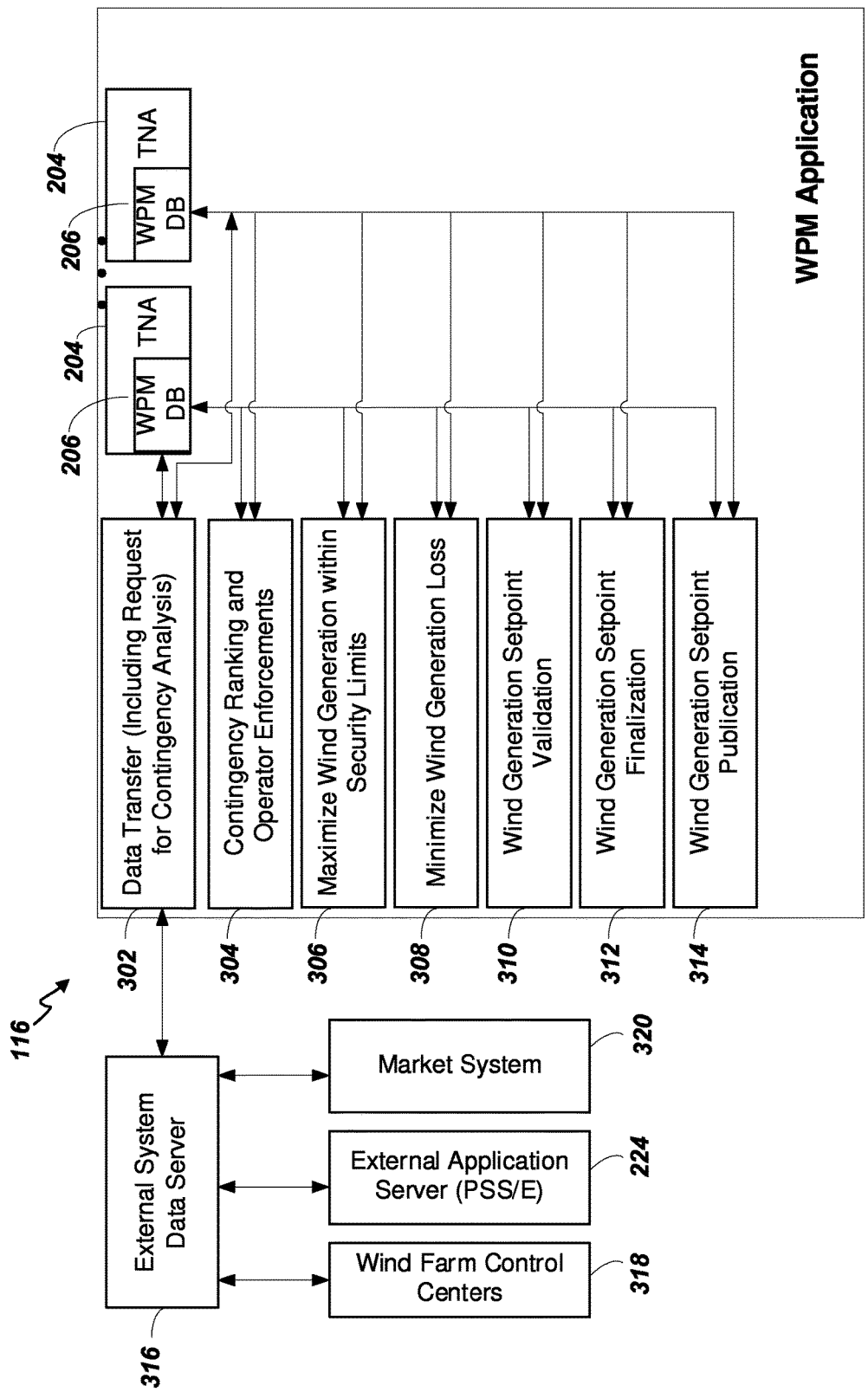
FIG. 3 is a block diagram of details of an example wind power management system according to embodiments of the present invention.

Turning to FIG. 3, details of the structure of the WPM application 116 are depicted. The WPM application 116 contains several functions that work together in a coordinated manner to acquire the needed data for fault analysis, conduct wind farm setpoint optimization, and store the needed results in the WPM database 206 and also in some flat files for external systems to use.

The Data Transfer program 302 of the WPM application 116 for the EMS 104 may run on COM servers 202 cyclically with a configurable execution periodicity or run upon demand. The external system data server (e.g., a Microsoft Windows based system) includes a database (e.g., Oracle) client, a support environment (e.g., PERL), and the daemon of a work flow controller (WFC). The WFC database shares the same database identifier (e.g., Oracle SID) with the WPM database 206. The external system data server 316 can be communicatively coupled to a fault analysis system 224 (e.g., PSS/E), wind farm control centers 318, and a market system 320.

The external system data server 316 is configured to have access to the WPM database 206 and the WFC database. All the data transfers can be done through the WPM database 206 and the WFC database. Flat data files to be transferred are stored directly into the WPM database 206 using, for example, the BLOB data type of an Oracle database. On the other hand, the WPM application 116 initiates execution of the fault analysis system 224 (e.g., PSS/E) for base case model adjustments and fault analysis. These commands that are to be executed on the external system data server 316 are stored in the WFC database. An automatic process is defined on the external system data server 316 to periodically check if there are any commands from the WPM application 116. When seeing these commands, the WFC process will first retrieve all the needed data files in the BLOB data format, for example, and then initiate the commands on the external system data server 316 as requested by the WPM application 116. Similarly, the result data from fault analysis system 224 is also stored in the WPM database 206 using, for example, the BLOB data type, and the WPM application 116 retrieves the results into data files on the COM servers 202.

Data stored in flat data files (e.g., contingencies, wind generation forecast for each wind farm, sensitivities for each wind farm, total wind generation loss for each contingency) from the external system data server 316 are also saved into the WPM database 206 for the WPM application 116 to use. The wind farm setpoints are retrieved from the WPM database 206 into the flat files and sent to the external system data server 316 through the WPM database 206. The WPM's request for fault analysis is also transmitted to the external system data server 316. When the fault analysis system 224 completes the fault analysis, the results are stored in flat files that will be read by the Data Transfer program 302 and saved into the WPM database 206.

When the results for the fault analysis are available, several WPM modules will be executed sequentially in an execution cycle, and the final wind setpoints will be published at the end to complete the cycle. The Contingency Ranking and Operator Enforcements module 304 determines if a contingency is a critical one or semi-critical one or a non-critical one; and also processes the operator's requirements. The Maximize Wind Generation within Security Limits module 306 solves a linear programming (LP) problem to determine the maximum admissible wind generation while considering the security limits. The Minimize Wind Generation Loss module 308 solves another LP problem to determine the wind farm setpoints while minimizing the wind generation loss and respecting the binding constraint on the maximum admissible wind generation total of the system obtained from the solution to the first LP problem.

The Wind Generation Setpoint Validation module 310 validates the wind farm setpoints obtained from the wind power optimization processes and the operator's enforcements and issues error messages if any violations are detected. The Wind Generation Setpoint Finalization module 312 considers the actual wind generation from all wind farms, the maximum admissible actual wind generation total and the maximum admissible wind farm setpoint total, and makes adjustments to the wind farm setpoints. The Wind Generation Setpoint Publication module 314 considers the change in wind farm restrictions, wind farm setpoint total, and wind farm actual generation total between the past and current execution cycles, and determines whether or not the newly calculated wind farm setpoint or the previous wind farm setpoint should be published for each wind farm. The results can be stored in a few data files in well know file formats such as of xls and csv.

Embodiments of the present invention implement a probabilistic security oriented approach while concurrently optimizing economics. There are times when integration of as much wind generation as possible into the power grid is desired without compromising the power grid's security. Other times only a limited amount of wind generation is allowed for integration into the power grid for the sake of security. "Security" as considered in embodiments of the present invention can embodied as follows. A set of nodes in the transmission network are identified where serious wind power loss may be caused if a three-phase short-circuit event occurs at any of these nodes, which causes a serious system generation shortage and maybe also overloading of some parts of the transmission system.

A wind farm that includes multiple wind generators may connect to one or multiple of the above identified transmission nodes. For notational convenience and without loss of generality, assume a wind farm connects to one transmission node. If the bus voltage reduces to a certain threshold level, the wind farm will trip, which causes the system to lose the wind power generation from this wind farm. Depending on whether or not the wind farm has the Low Voltage Ride-Through (LVRT) capability and the type of the LVRT capability, the wind farm can withstand voltage as low as 90%, 85%, or 20% of its nominal value for a short period of time.

The solution from the State Estimator is used as a base case for which the three-phase short-circuit event is applied to a transmission node identified from above, which is considered a contingency. The State Estimator can use real time system conditions or project power system conditions for a future time to create the base case for the real time user and the study users. A fault analysis is conducted to identify which wind farms would trip if a contingency is applied. The total loss of wind power from those wind farms that would trip is computed. For each contingency, the total wind power loss is compared to pre-designated wind power loss thresholds and the level of seriousness is thus determined. This is called contingency ranking herein. A contingency may be ranked critical, semi-critical and non-critical.

The contingencies identified in the above may not occur with the same probability. If all the contingencies are equally likely to occur, the problem reduces to an equiprobability scenario. The algorithm described below addresses the general non-equiprobability case and treats the equiprobability scenario as a special case.

The determination of wind farm's setpoints is achieved in the process of maximizing system wind generation and minimizing system wind generation loss while respecting the restricted system-level wind generation or no restriction on the system-level wind generation; restricted wind-farm-level wind generation; and restricted wind generation from groups of wind farms.

Besides the security that is addressed, the economics aspect is also considered. To ensure that the security achieved through the above mentioned process of maximizing system wind generation and minimizing system wind generation loss is enforced during the economics optimization, logic is developed to group wind farms based on their sensitivities to security as follows. First, the wind farm's sensitivities with respect to identified contingencies are computed, which results in a set of boolean values (0 designated for not being affected by a contingency or 1 designated for affected by a contingency) for each wind farm. Second, wind farms that are not affected by any of the contingencies are grouped as security-priority 1 group. Each wind farm in this group has all 0 valued sensitivities. Third, a list of wind farms is created that exclude all the wind farms with the security-priority 1 group. Loop through this list of wind farms that are affected by at least one of the contingencies. The security-priority 2 group begins with the first wind farm of this list. All the wind farms that have the same set of sensitivities as the first wind farm in this list are group into the security-priority 2 group. Fourth, a list of wind farms is created that exclude all the wind farms with the security-priority 1 group and the security-priority 2 group. Repeat the previous step to identify the security-priority 3 group. Repeat this process until all the security-priority groups are identified. Note that all security-priority groups are mutually exclusive.

With the security-priority groups identified, the intra-group optimal wind generation dispatch can be conducted. The total wind generation for each security-priority group can be obtained from the process of maximizing system wind generation and minimizing system wind generation loss. This group total wind generation for each security-priority group is then economically redistributed.

For the intra-group optimal wind generation dispatch, there are two typical cases that are considered. One, wind farms are competing for provision of their wind generation based on their bid prices, and two, wind farms are competing for provision of their wind generation based on their cost priorities. Some wind farms provide wind generation based on a long-term contract basis, which may be designated as cost-priority 3 wind farms; some others are through a flat and cheaper rate, which may be designated as cost-priority 2 wind farms; and the remaining are providing for free, which may be designated as cost-priority 1 wind farms. When system security permits, and there is a chance to increase system wind generation, the increments should be first applied to cost-priority 1 wind farms, followed by cost-priority 2 wind farms, and finally cost-priority 3 wind farms. When system security requires reduction in system wind power generation, the decrements should be first applied to cost-priority 3 wind farms, followed by cost-priority 2 wind farms, and finally cost-priority 1 wind farms.

The WPM application 116 involves solving two system-level optimization problems and a number of group-level optimization problems. The fault analysis classifies the contingencies and those that are critical and semi-critical are incorporated in the optimization processes. The fault analysis conducted by PSS/E produces three categories of contingencies that are classified based on the risk level:

Critical contingencies—Those that cause wind generation loss that is greater than the maximum admissible wind generation loss.

Semi-critical contingencies—Those that cause wind generation loss that added to a configurable adder constant (e.g., 200 MW), is greater than the maximum admissible wind generation loss.

Non-critical contingencies—Those that are not critical contingencies, nor semi-critical contingencies. In other words, the non-critical contingencies cause loss of wind generation that added to the above mentioned configurable adder constant, is not greater than the maximum admissible wind generation loss.

The contingencies are basically three-phase, short-circuit faults following a geographical distribution pattern. The total number of the contingencies is a configurable constant (e.g., 70). The actual telemetered wind generation from each farm is used in the fault analysis and for estimating the wind generation loss, which in turn determines the rank of each contingency.

Determination of wind farm's sensitivities is now described. To facilitate the convenient reference to whether or not a wind farm (indexed by i ranging from 1 to the maximum number $N_w$ of the wind farms) is affected by a three-phase short-circuit contingency applied, the sensitivity is defined and computed as follows:

$S_{i,j}$—The sensitivity of the ith wind farm (i=1, 2, . . . , $N_w$) with respect to the jth contingency (j=1, 2, . . . , $N_c$). The sensitivity is either 1 or 0. The sensitivity $S_{i,j}$ assumes a value of 1 if the ith wind farm switches off due to the voltage dip caused by the jth contingency. The sensitivity $S_{i,j}$ assumes a value of 0 if the ith wind farm does not switch off due to the voltage dip caused by the jth contingency.

Maximizing wind generation within security limits is now described. This function solves a linear programming (LP) problem that maximizes the wind power production of all wind farms subject to the following three types of constraints:

The constraints based on fault analysis that the total wind generation loss must not be greater than the admissible maximum for all the selected contingencies. Note that only critical contingencies are included.

The operator enforced global, system-level MW constraint that the wind power contribution from all wind farms must not exceed the operator enforced MW value.

The operator enforced local, group-level MW constraint that for each wind farm group identified by the operator, the wind power contribution from all the wind farms within the group must not exceed the operator enforced MW value for that wind farm group. The operator's enforced MW constraint for each wind farm if existing is also included in this category as a special case.

The problem of maximizing the wind generation within security limits can be mathematically formulated as follows:
Find $P_i$'s (i=1, 2, . . . , $N_w$) to maximize $P_{total,sys} = \Sigma_{k=1}^{N_c} \Sigma_{i=1}^{N_w} P_i \rho_k$
Subject to the following constraints:
Security Constraint: $P_{loss,j} = \Sigma_{i=1}^{N_w} P_i * S_{i,j} \leq P_{max,loss}$, j=1, 2, . . . , $N_{cc}$.
Note that only critical constraints identified by the contingency ranking are included.
System Enforcement Constraint: $\Sigma_{i=1}^{N_w} P_i \leq P_{sys,enforce}$.
Wind Farm Group Enforcement Constraint: $\Sigma_{i=1}^{N_{g,m}} P_{n_{m,i}} \leq P_{m,enforce}$, m=1, 2, . . . , $N_g$.
Wind Farm Constraint: $0 \leq P_i \leq \min(P_{i,act}, P_{i,manual})$, i=1, 2, . . . , $N_w$
Where the relevant variables are defined as follows:
$N_w$—Number of wind farms in the system.
$N_g$—Number of wind farm groups in the system.
$N_{g,m}$—Number of wind farms in the nth wind farm group (m=1, 2, . . . , $N_g$).
$N_c$—Number of contingencies identified from Fault Analysis, which is the sum of number of critical contingencies, number of semi-critical contingencies, and number of non-critical contingencies. A larger value implies more execution time and may cause performance issues.

$N_{cc}$—Number of critical contingencies identified from Fault Analysis.
$N_{sc}$—Number of semi-critical contingencies identified from Fault Analysis.
$N_{nc}$—Number of non-critical contingencies identified from Fault Analysis.
$S_{i,j}$—The sensitivity of the ith wind farm (i=1, 2, . . . , $N_w$) with respect to the jth contingency (j=1, 2, . . . , $N_c$). The sensitivity is either 1 or 0. The sensitivity $S_{i,j}$ assumes a value of 1 if the ith wind farm switches off due to the voltage dip caused by the jth contingency. The sensitivity $S_{i,j}$ assumes a value of 0 if the ith wind farm does not switch off due to the voltage dip caused by the jth contingency. Ensure that the indexes are created to begin with lower number for critical contingencies, followed by semi-critical contingencies, and then non-critical contingencies with larger number. As such there is no need to adjust the indexes when using both critical and semi-critical contingencies in the second optimization problem described below.
$P_i$—The wind power output of the ith wind farm (i=1, 2, . . . , $N_w$).
$P_{n_{m,i}}$—The wind power output of the $n_{m,i}$th wind farm ($n_{m,i}$=1, 2, . . . , $N_w$) which is the ith wind farm (i=1, 2, . . . , $N_{g,m}$) in the mth wind farm group (m=1, 2, . . . , $N_g$).
$\rho_k$—The probability of the kth three-phase short-circuit event or contingency.
$P_{i,act}$—The current wind power output of the ith wind farm.
$P_{i,manual}$—The operator enforced maximum wind power setpoint of the ith wind farm.
$P_{m,enforce}$—The operator specified maximum allowed wind generation total by the nth wind farm group.
$P_{max,loss}$—The maximum wind generation loss admissible in the system.
$P_{total,sys}$—The sum total of wind generation in the system, which can be represented as $P_{total,sys} = \Sigma_{i=1}^{N_w} P_i$.
$P_{sys,enforce}$—The operator specified maximum allowed wind generation total in the system.
$P_{loss,j}$—The total loss of wind generation in the system due to the jth contingency, which can be represented by $P_{loss,j} = \Sigma_{i=1}^{N_w} P_i * S_{i,j}$.
$P_i^*$—The optimal wind power output of the ith wind farm that is obtained from the solution to the following optimization problem.
$P_{total,sys}^*$—The sum total of optimal wind generation in the system, which can be represented as $P_{total,sys}^* = \Sigma_{i=1}^{N_w} P_i^*$.

Note that the maximum wind generation obtained from the optimization process constitutes a binding constraint for the wind generation loss minimization problem described below. The wind generation allocation to each wind farm obtained from the optimization process is not binding. There may be multiple solutions to this problem in the sense there may be multiple different wind generation allocations to all the wind farms, but the total wind generation is optimized. It is also noteworthy that maximizing $P_{total,sys} = \Sigma_{k=1}^{N_c} \Sigma_{i=1}^{N_w} P_i \rho_k$—this objective function is identical to maximizing $P_{total,sys} = \Sigma_{i=1}^{N_w} P_i$.

Minimizing wind generation loss is now described. This function solves a LP problem that minimizes the sum of the total wind generation losses due to all the contingencies applied in the above wind generation maximization problem, subject to the following four types of constraints:

The constraints based on fault analysis that include both critical contingencies and semi-critical contingencies.

The operator enforced global system-level MW constraint that the wind power contribution from all wind farms must not exceed the operator enforced MW value.

The operator enforced local group-level MW constraint that for each wind farm group identified by the operator, the wind power contribution from all the wind farms within the group must not exceed the operator enforced MW value for that wind farm group. The operator's enforced MW constraint for each wind farm if existing is also included in this category as a special case.

The binding constraint on the total sum of wind generation of all the wind farms in the system resulting from the wind generation maximization problem.

The LP problem of minimizing wind generation loss can be mathematically formulated as follows:

Find $P_i$'s ($i=1, 2, \ldots, N_w$) to minimize $P_{loss} = \sum_{j=1}^{N_{cc}+N_{sc}} \rho_j \sum_{i=1}^{N_w} P_i * S_{i,j}$ Subject to the following constraints:

System Total Wind Generation Constraint: $\sum_{i=1}^{N_w} P_i = P_{total,sys}^*$.

Security Constraint: $P_{loss,j} = \sum_{i=1}^{N_w} P_i * S_{i,j} \leq P_{max,loss}$, $j=1, 2, \ldots, N_{cc}+N_{sc}$.

System Enforcement Constraint: $\sum_{i=1}^{N_w} P_i \leq P_{sys,enforce}$.

Wind Farm Group Enforcement Constraint: $\sum_{i=1}^{N_{g,m}} P_{n_{m,i}} \leq P_{m,enforce}$, $m=1, 2, \ldots, N_g$.

Wind Farm Constraint: $0 \leq P_i \leq \min(P_{i,act}, P_{i,manual})$, $i=1, 2, \ldots, N_w$.

Where the additional relevant variables are defined as follows besides those already defined in the wind generation maximization problem:

The contingency j indexes the critical contingencies from 1 to $N_{cc}$, then indexes the semi-critical contingencies from $N_{cc}+1$ to $N_{cc}+N_{sc}$. It is obvious that all the critical and semi-critical contingencies meet the condition that the total wind generation loss due to each of tem, added to a configurable constant $P_{adder}$ (e.g., 200 MW), is greater than the maximum admissible wind generation, i.e., $P_{loss,j} + P_{adder} > P_{max,loss}$ where $j=1, 2, \ldots, N_{cc}+N_{sc}$. Note that $N_{cc}+N_{sc} \leq N_c$.

$P_{loss}$—The total loss of wind generation in the system due to all the $N_{cc}+N_{sc}$ contingencies which occur at the corresponding probabilities $\rho_j$'s, which can be represented by $P_{loss} = \sum_{j=1}^{N_{cc}+N_{sc}} \rho_j P_{loss,j} = \sum_{j=1}^{N_{cc}+N_{sc}} \rho_j \sum_{i=1}^{N_w} P_i * S_{i,j}$.

Note that if all the contingencies occur at equal probabilities, then minimizing the objective function is equivalent to minimizing $\sum_{j=1}^{N_{cc}+N_{sc}} \sum_{i=1}^{N_w} P_i * S_{i,j}$.

Determination of wind farm security-priority groups is now described. To facilitate the cost minimization associated with provision of a certain amount of wind power generation and yet without compromising system security, the wind farm security-priority groups are identified in the manner discussed above with respect to a probabilistic security oriented approach and economics optimization methods. The following variables are defined:

$N_{sg}$—Number of wind farm security-priority groups in the system.

$N_{sg,g}$—Number of wind farms in the gth security-priority group ($g=1, 2, \ldots, N_{sg}$).

$P_{n_{sg,g,i}}$—The wind power of the $n_{sg,g,i}$th wind farm ($n_{sg,g,i}=1, 2, \ldots, N_w$) which is the ith wind farm ($i=1, 2, \ldots, N_{sg,g}$) in the gth security-priority group ($g=1, 2, \ldots, N_{sg}$).

$P_{n_{sg,g}}$—The sum total of the wind power of all the wind farms in the gth security-priority group ($g=1, 2, \ldots, N_{sg}$).

Note that from the process of maximizing system wind generation and minimizing system wind generation loss, all the wind farms are assigned desired MW values in the security consideration. From them, the sum total of the wind power of all the wind farms in the gth security-priority group ($g=1, 2, \ldots, N_{sg}$) can be obtained as $P_{n_{sg,g}} = \sum_{i=1}^{N_{sg,g}} P_{n_{sg,g,i}}$.

For each security-priority group, the wind power group total will be enforced as a constraint. The intra-group optimal wind power dispatch is to redistribute the wind power to individual wind farms so that the best economics result is obtained. As such, there are as many as $N_{sg}$ intra-group wind power dispatch problems needed to be solved.

Note that in the process of maximizing system wind generation and minimizing system wind generation loss, there may or may be group constraints, which are conceptually different from security-priority groups. Since the determined wind farm dispatch MW is obtained from the optimization process with the group constraints enforced if they exist, there is a need to check each security-priority group and see if it is entirely within a wind farm group. If not, the wind farms of the security-priority group that also are within a same wind farm group, are formed as a new security-priority group; and the rest wind farms of the security-priority group, if none of them belongs to a wind farm group will be formed as a new security-priority group; and intra-group wind power dispatch will be conducted for those new security-priority groups but not for the original security-priority group. With this strategy, an assumption is made without loss of generality that each security-priority group is within a same wind farm group if it exists.

Minimizing wind generation production cost based on cost priority is now described. For each of the security-priority group, the group's total wind power is redistributed among the wind farms in the group based on the cost priority of each wind farm in the security-priority group:

Assign an artificial price of $C_3$ (e.g., 100$/MWh) for the cost-priority 3 wind farms.

Assign an artificial price of $C_2$ (e.g., 50$/MWh) for the cost-priority 2 wind farms.

Assign an artificial price of $C_1$ (e.g., 10$/MWh) for the cost-priority 1 wind farms.

Ensure that $C_3$ is significantly higher than $C_2$, which in turn is significantly higher than $C_1$.

The LP problem of minimizing wind generation cost for the gth security-priority group ($g=1, 2, \ldots, N_{sg}$) can be mathematically formulated as follows:

Find $P_{n_{sg,g,i}}$'s ($i=1, 2, \ldots, N_{sg,g}$) to minimize cost $C_{n_{sg,g}} = \sum_{i=1}^{N_{sg,g}} P_{n_{sg,g,i}} C_{c_{sg,g,i}}$ Subject to the following constraints:

Security-Priority Group Total Wind Generation Constraint: $\sum_{i=1}^{N_{sg,g}} P_{n_{sg,g,i}} = P_{n_{sg,g}}$.

Wind Farm Constraint: $0 \leq P_{n_{sg,g,i}} \leq \min(P_{n_{sg,g,i},act}, P_{n_{sg,g,i},manual})$, $1 \leq n_{sg,g,i} \leq N_w$.

Where an additional variable is defined as follows:

$c_{sg,g,i}$—The cost index (between 1 and 3) of the $n_{sg,g,i}$th wind farm ($1 \leq n_{sg,g,i} \leq N_w$) which is the ith wind farm ($i=1, 2, \ldots, N_{sg,g}$) in the gth security-priority group ($1 \leq g \leq N_{sg}$). $C_{c_{sg,g,i}}$ represents the price associated with the ith wind farm ($i=1, 2, \ldots, N_{sg,g}$) in the gth security-priority group ($1 \leq g \leq N_{sg}$).

This process conceptually achieves the following: When system security permits, and there is a chance to increase system wind generation, the increments should be first applied to cost-priority 1 wind farms, followed by cost-priority 2 wind farms, and finally cost-priority 3 wind farms. When system security requires reduction in system wind power generation, the decrements should be first applied to cost-priority 3 wind farms, followed by cost-priority 2 wind farms, and finally cost-priority 1 wind farms.

Minimizing wind generation production cost based on bid is now described. For each of the security-priority group, the group's total wind power is redistributed among the wind farms in the group based on the energy bid of each wind farm in the security-priority group.

The LP problem of minimizing wind generation cost for the gth security-priority group (g=1, 2, ..., $N_{sg}$) can be mathematically formulated as follows:

Find $P_{n_{sg,g,i}}$'s (i=1, 2, ..., $N_{sg,g}$) to minimize cost $C_{n_{sg,g}} = \sum_{i=1}^{N_{sg,g}} P_{n_{sg,g,i}} C_{n_{sg,g,i}}$ Subject to the following constraints:

Security-Priority Group Total Wind Generation Constraint:
$\sum_{i=1}^{N_{sg,g}} P_{n_{sg,g,i}} = P_{n_{sg,g}}$.

Wind Farm Constraint: $0 \le P_{n_{sg,g,i}} \le \min(P_{n_{sg,g,i},act}, P_{n_{sg,g,i},manual})$, $1 \le n_{sg,g,i} \le N_w$.

Where an additional variable is defined as follows:

$C_{n_{sg,g,i}}$—The energy price of the $n_{sg,g,i}$th wind farm ($1 \le n_{sg,g,i} \le N_w$) which is the ith wind farm (i=1, 2, ..., $N_{sg,g}$) in the gth security-priority group ($1 \le g \le N_{sg}$). $C_{c_{sg,g,i}}$ represents the price associated with the ith wind farm in the gth security-priority group.

This process conceptually achieves the following: When system security permits, and there is a chance to increase system wind generation, the increments should be first applied to cheapest wind farms, followed by more expensive wind farms, and finally the most expensive wind farms. When system security requires reduction in system wind power generation, the decrements should be first applied to the most expensive wind farms, followed by less expensive wind farms, and finally cheapest wind farms.

The wind farms are to be modeled properly in both Supervisory Control and Data Acquisition (SCADA) and AGC databases. As such the actual wind power measurement of individual wind farms can be acquired and updated into the AGC database, which in turn are used by the WPM application 116. Conversely, the wind farm setpoints determined by the WPM application 116 are updated to the AGC database relations, which in turn are sent out via SCADA, CFE and ICCP to wind farms.

The WPM application 116 supports a real-time user and study-mode users. The WPM application 116 supports cyclic automatic execution and additional manual execution for the convenience of the operator. The WPM application is initiated during a system start-up, and waits to receive a softbus signal following the Siemens inter-application communication mechanism to start cyclic execution. It will terminate when receiving a softbus signal demanding it to terminate its execution.

Figure 4:
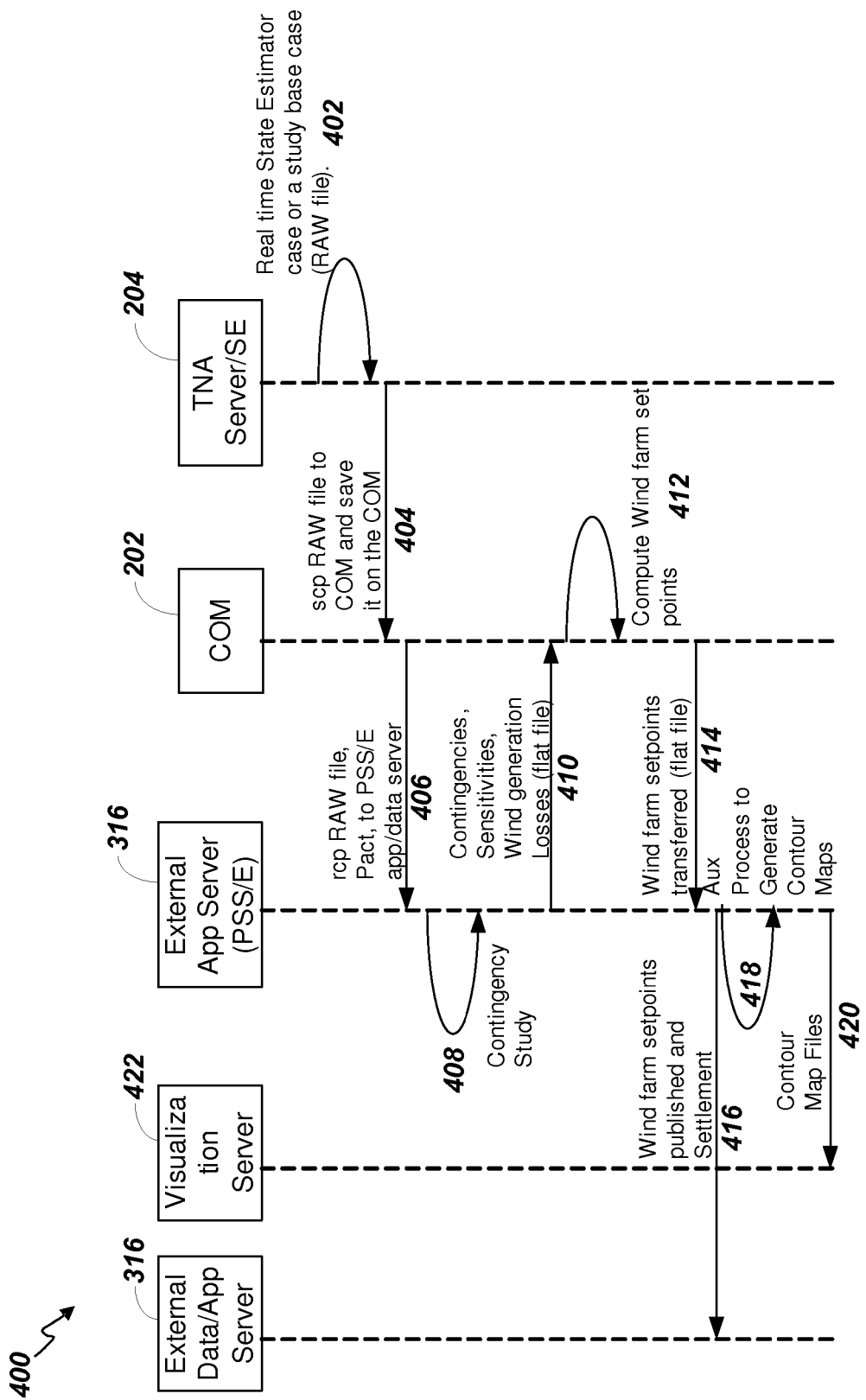
FIG. 4 is a sequence chart depicting an example method according to embodiments of the present invention.

In a cyclic execution, the WPM application performs the following process in a sequence 400, as depicted in FIG. 4. The TNA server 204 sends out a request to conduct fault analysis along with a TNA Sate Estimator generated SE case (404) that is transferred by the data transfer program 302. The base case used by PSS/E can come from the real-time State Estimator or a study user (402). In either case, a base case can be created in the RAW file format and is sent to PSS/E by the data transfer program 302 (406). The TNA server 204 waits until the PSS/E completes the fault analysis (408) and makes available the fault analysis results that are transferred and stored into the WPM database by the data transfer program 302. The WPM application 116 next conducts contingency ranking and processes the operator's enforcements (410). This includes solving the wind generation maximization problem and the wind generation loss minimization problem to compute the wind farm setpoints and carry out the wind farm setpoint validation process (412). The setpoints are finalized and transferred to the external system data server 316 (414). The wind farm setpoints are published and the settlement process executes (416). In some embodiments, an auxiliary process is provided to generate contour maps on the external system data server 316 (418) which are then transferred (420) for display on a visualization server 422.

Figure 5:
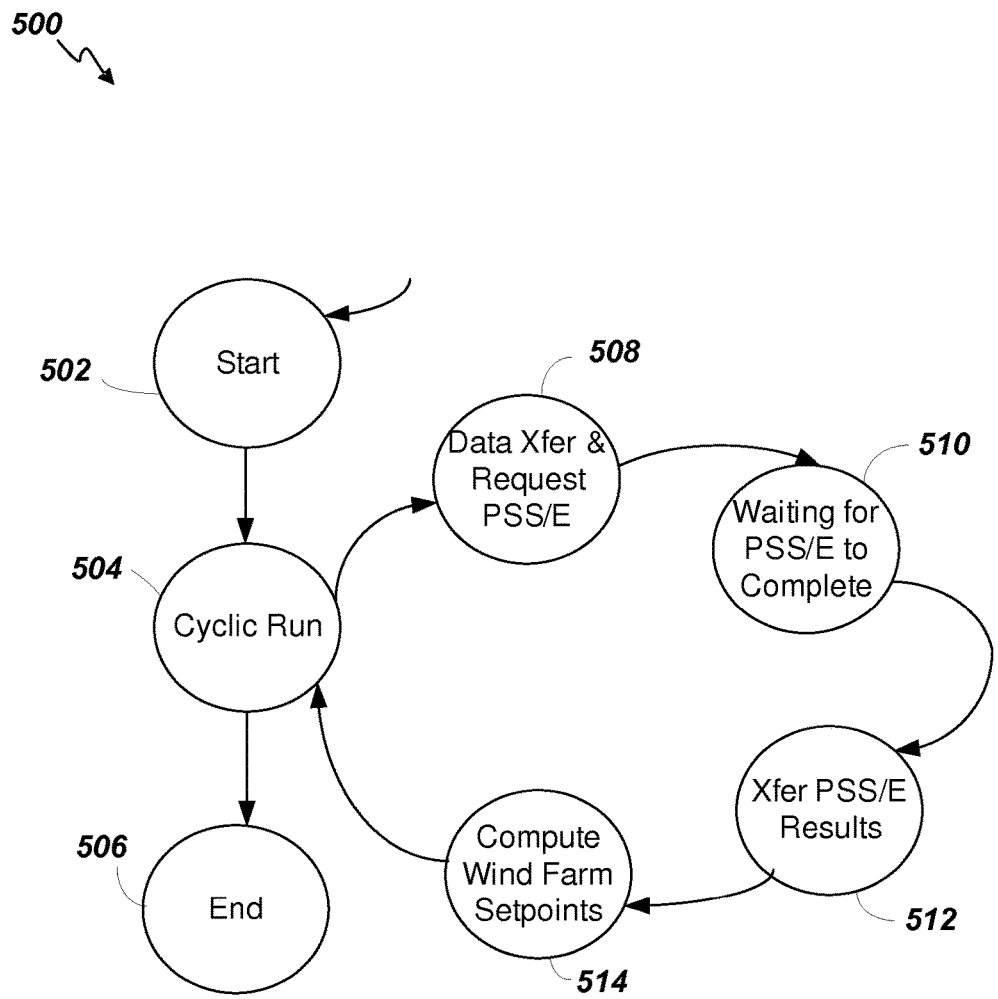
FIG. 5 is a state diagram depicting states of an example wind power management system according to embodiments of the present invention.

Turning now to FIG. 5, a state diagram 500 for the WPM application 116 is depicted. The WPM application 116 can be in one of the following states: Initiation 502 prior to its cyclic run, Cyclic execution 504, or Termination 506. Cyclic execution 504 includes the states of Requesting 508 the fault analysis system 224 to carry out fault analysis, Waiting 510 for the fault analysis system 224 to complete fault analysis and checking for the fault analysis completion indicator, Transferring 512 of the analysis results, and Computing 514 of the wind farm setpoints via the optimization processes.

Ideally, when the wind farms respond to the wind farm setpoints computed by the WPM application 116 and the wind farm's actual power outputs match the wind farm setpoints with the fluctuations within a desired tolerance, then there is no need for additional adjustments of the wind farm setpoints determined based on economic and security considerations. However, in reality, for various reasons, there are times when wind farms do not respond within a tolerable deviation to the wind farm setpoints computed by the WPM application 116. In such cases, the setpoints of wind farms may be adjusted to adapt to the reality. These adjustments are now described.

The adjustments are done within each security-priority group as discussed above. Then the adjustments are made based on the wind farm's cost-priority or energy bid prices as discussed above. It is next determined if the system wind generation needs to be increased or reduced based on the difference between the system total actual wind generation (System_Actual) and the system desired wind generation setpoint total (System_Desired) obtained from the optimization processes described above. The amount of the wind generation that needs to be redistributed is then determined. There can be three different cases.

In Case 1, where system wind generation setpoint is to be reduced, the incremental change for redistribution Delta_Redistr is computed as:

Delta_Redistr=System_Actual−System_Desired.

In Case 2, where the system wind generation setpoint is to be increased and the system desired wind generation setpoint total (System_Desired) is greater than the current wind generation setpoint total in use (System_Current_Setpoint), the incremental change for redistribution Delta_Redistr is computed as:

Delta_Redistr=System_Desired−System_Current_Setpoint.

In Case 3, where the system wind generation setpoint is to be increased and the system desired wind generation setpoint total (System_Desired) is not greater than the current wind generation setpoint total in use (System_Current_Setpoint), the incremental change for redistribution Delta_Redistr is computed as:

Delta_Redistr=System_Actual−System_Desired.

In correspondence to these three cases identified for system wind generation incremental change for redistribution, each security-priority group has respective group-wise wind generation actual total, and wind generation setpoint total accordingly.

In correspondence to Case 1 and Case 3, each wind farm is initially assigned a setpoint of its actual, and the additional incremental change (to be added to the wind farm's setpoint)

is based on their cost-priority or energy bid price, and each wind farm's margin that starts from its actual to its allowed MW maximum.

For Case 1, if the most expensive wind farms have sufficient margin for allocating the system incremental change for redistribution Delta_Redistr among them, proportional redistribution of Delta_Redistr among them is done based each wind farm's margin; if the most expensive wind farms do not have sufficient margin for allocating the system incremental change for redistribution Delta_Redistr among them, they will be loaded to their allowed MW minimum, and the remaining will be redistributed among less expensive wind farms, and continue until all the wind farms are assigned incremental setpoint changes properly.

For Case 3, if the cheapest wind farms have sufficient margin for allocating the system incremental change for redistribution Delta_Redistr among them, proportional redistribution of Delta_Redistr among them is done based each wind farm's margin; if the cheapest wind farms do not have sufficient margin for allocating the system incremental change for redistribution Delta_Redistr among them, they will be loaded to their allowed MW maximum, and the remaining will be redistributed among more expensive wind farms, and continue until all the wind farms are assigned incremental setpoint changes properly.

In correspondence to Case 2, each wind farm is initially assigned a setpoint of its current setpoint in use, and the additional incremental change (to be added to the wind farm's setpoint) is based on their cost-priority or energy bid price.

For Case 2, if the cheapest wind farms have sufficient margin for allocating the system incremental change for redistribution Delta_Redistr among them, proportional redistribution of Delta_Redistr among them is done based each wind farm's margin; if the cheapest wind farms do not have sufficient margin for allocating the system incremental change for redistribution Delta_Redistr among them, they will be loaded to their allowed MW maximum, and the remaining will be redistributed among more expensive wind farms, and continue until all the wind farms are assigned incremental setpoint changes properly.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality/features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of controlling an energy delivery system, the method comprising:
   providing an energy management system (EMS) including a wind power management (WPM) system;
   determining sensitivity values for a plurality of wind farms within the energy delivery system using the WPM system;
   maximizing wind power generation from the plurality of wind farms within a set of security limits defined based on the sensitivity values using the WPM system;
   minimizing wind power generation loss from the plurality of wind farms using the WPM system;
   determining wind farm security-priority groups using the WPM system;
   minimizing wind power generation production cost based on cost priority of the wind farms in each security-priority group using the WPM system;
   minimizing wind power generation production cost based on energy bids for each wind farm in each security-priority group using the WPM system;
   conducting a fault analysis to identify which wind farms would trip if a contingency is applied;
   computing a total loss of wind power from those wind farms that would trip; and
   for each of the contingencies, comparing the total loss of wind power to pre-designated wind power loss thresholds for determining a contingency ranking,
   wherein the contingency may be ranked as a critical contingency, a semi-critical contingency or a non-critical contingency,
   wherein the critical contingency is that which causes a wind generation loss that is greater than a maximum admissible wind generation loss, wherein the semi-critical contingency is that which causes the wind generation loss that added to a configurable adder constant is greater than the maximum admissible wind generation loss, and wherein the non-critical contingency is that which are neither critical contingencies nor semi-critical contingencies.

2. The method of claim 1 wherein determining the sensitivity values includes determining, for each wind farm, whether each of a plurality of three-phase short-circuit contingencies applied to the wind farm shuts off the wind farm.

3. The method of claim 2 wherein maximizing wind power generation includes maximizing wind power generation subject to constraints based on the fault analysis wherein a total wind generation loss will not be greater than an admissible maximum for the plurality of applied contingencies.

4. The method of claim 3 wherein minimizing wind power generation loss includes minimizing a total wind generation loss amount due to the plurality of contingencies applied while maximizing wind power generation, subject to constraints based on fault analysis.

5. The method of claim 1 wherein determining wind farm security-priority groups includes grouping wind farms based on a ranking of sensitivity values.

6. The method of claim 1 wherein minimizing wind power generation production cost based on cost priority includes, for each of the security-priority groups, redistributing a group total wind power among the wind farms in the security-priority group based on a cost priority of each wind farm in the security-priority group.

7. The method of claim 1 wherein minimizing wind power generation production cost based on energy bids includes, for each of the security-priority groups, redistributing a group total wind power among the wind farms in the security-priority group based on an energy bid of each wind farm in the security-priority group.

8. An energy management system (EMS) comprising:
a process controller;
a memory coupled to the process controller and storing instructions executable on the process controller, the instructions operable to cause the processor to:
determine sensitivity values for a plurality of wind farms within an energy delivery system;
maximize wind power generation from the plurality of wind farms within a set of security limits defined based on the sensitivity values;
minimize wind power generation loss from the plurality of wind farms;
determine wind farm security-priority groups;
minimize wind power generation production cost based on cost priority of the wind farms in each security-priority group;
minimize wind power generation production cost based on energy bids for each wind farm in each security-priority group;
conduct a fault analysis to identify which wind farms would trip if a contingency is applied;
compute a total loss of wind power from those wind farms that would trip; and
for each of the contingencies, comparing the total loss of wind power to pre-designated wind power loss thresholds for determining a contingency ranking, wherein the contingency may be ranked as a critical contingency, a semi-critical contingency or a non-critical contingency, wherein the critical contingency is that which causes a wind generation loss that is greater than a maximum admissible wind generation loss, wherein the semi-critical contingency is that which causes the wind generation loss that added to a configurable adder constant is greater than the maximum admissible wind generation loss, and wherein the non-critical contingency is that which are neither critical contingencies nor semi-critical contingencies.

9. The EMS of claim 8 wherein the instructions operable to cause the processor to determine sensitivity values includes instructions operable to cause the processor to determine, for each wind farm, whether each of a plurality of three-phase short-circuit contingencies applied to the wind farm shuts off the wind farm.

10. The EMS of claim 9 wherein the instructions operable to cause the processor to maximize wind power generation includes instructions operable to cause the processor to maximize wind power generation subject to constraints based on the fault analysis wherein a total wind generation loss will not be greater than an admissible maximum for the plurality of applied contingencies.

11. The EMS of claim 10 wherein the instructions operable to cause the processor to minimize wind power generation loss includes instructions operable to cause the processor to minimize a total wind generation loss amount due to the plurality of contingencies applied while maximizing wind power generation, subject to constraints based on fault analysis.

12. The EMS of claim 8 wherein the instructions operable to cause the processor to determine wind farm security-priority groups includes instructions operable to cause the processor to group wind farms based on a ranking of sensitivity values.

13. The EMS of claim 8 wherein the instructions operable to cause the processor to minimize wind power generation production cost based on cost priority includes instructions operable to cause the processor to, for each of the security-priority groups, redistribute a group total wind power among the wind farms in the security-priority group based on a cost priority of each wind farm in the security-priority group.

14. The EMS of claim 8 wherein the instructions operable to cause the processor to minimize wind power generation production cost based on energy bids includes instructions operable to cause the processor to, for each of the security-priority groups, redistribut a group total wind power among the wind farms in the security-priority group based on an energy bid of each wind farm in the security-priority group.

* * * * *